(12) United States Patent
Yamashita

(10) Patent No.: US 6,771,050 B2
(45) Date of Patent: Aug. 3, 2004

(54) BATTERY CHARGE HAVING A PLURALITY OF CHANNELS

(75) Inventor: Takahiro Yamashita, Sumoto (JP)

(73) Assignee: Sanyo Electric Co., Ltd., Osaka (JP)

(*) Notice: Subject to any disclaimer, the term of this patent is extended or adjusted under 35 U.S.C. 154(b) by 81 days.

(21) Appl. No.: 10/107,493

(22) Filed: Mar. 28, 2002

(65) Prior Publication Data

US 2002/0167295 A1 Nov. 14, 2002

(30) Foreign Application Priority Data

Mar. 29, 2001 (JP) ........................................ 2001-095929

(51) Int. Cl.[7] ................................................ H02J 7/04
(52) U.S. Cl. ..................................................... 320/150
(58) Field of Search ................................. 320/150, 106, 320/107, 110, 112, 113, 127, 128, 130, 131, 152, 136

(56) References Cited

U.S. PATENT DOCUMENTS

| | | | | |
|---|---|---|---|---|
| 4,146,825 A | * | 3/1979 | Harhay | 320/107 |
| 5,355,072 A | * | 10/1994 | Satsuma et al. | 320/131 |
| 5,479,084 A | * | 12/1995 | Satsuma et al. | 320/136 |
| 6,236,186 B1 | * | 5/2001 | Helton et al. | 320/106 |
| 6,326,767 B1 | * | 12/2001 | Small et al. | 320/150 |

FOREIGN PATENT DOCUMENTS

WO   WO009314548 A1 * 7/1993

* cited by examiner

Primary Examiner—Pia Tibbits
(74) Attorney, Agent, or Firm—Wenderoth, Lind & Ponack, L.L.P.

(57) ABSTRACT

A battery charger for charging a plurality of rechargeable batteries and is provided with temperature sensors for detecting battery temperature. The battery charger compares the battery temperature detected by the temperature sensors and charging stop temperature, and stops charging when the detected temperature becomes greater than the charging stop temperature. The battery charger has a plurality of attachment detecting portions for detecting attachment of the batteries respectively and independently. The number of temperature sensors is less than the maximum number of the batteries that can be attached. The battery charger varies the charging stop temperature for stopping charging in accordance with the battery-attached positions detected by the attachment detecting portions.

13 Claims, 2 Drawing Sheets

BATTERY CHARGE HAVING A PLURALITY OF CHANNELS

This application is based on application Ser. No. 095929 filed in Japan on Mar. 29, 2001, the content of which is incorporated hereinto by reference.

BACKGROUND OF THE INVENTION

1. Field of the Invention

This invention relates to a battery charger for charging a plurality of batteries, and more particularly to a battery charger that controls charging current by detecting battery temperature.

2. Description of Related Art

Battery temperature rises during charging. Specifically, when batteries are charged continuously after being fully charged, the temperature of the batteries rises rapidly. Therefore, the fully charged status of the batteries can be detected by detecting the battery temperature, which makes it possible to stop charging when the batteries reach full charge. Further, the temperature of abnormal batteries may rise to an abnormally high level during charging. For this reason, it is possible to stop charging the abnormal batteries by detecting the battery temperature.

A battery charger, which detects fully charged batteries or abnormal batteries by temperature, is provided with temperature sensors for detecting battery temperature. The temperature sensors are disposed near each battery so as to detect the temperature of each battery. In a battery charger having a plurality of attachment channels for charging a plurality of batteries, temperature sensors are disposed near each battery so as to detect the temperature of each battery with precision. A battery charger having this structure requires the same number of temperature sensors as the number of batteries. For example, in a battery charger for charging four batteries, four temperature sensors are needed. For this reason, the battery charger has the drawback that the cost of production and parts becomes high due to the increased number of temperature sensors.

The drawback of the increased number of temperature sensors can be overcome by allowing a temperature sensor to detect the temperature of a plurality of batteries. In a battery charger that realizes this, one temperature sensor is disposed between adjacent batteries. In this battery charger, the battery temperature can be made lower than a charging stop temperature when all the attachment portions are provided with batteries. For example, a battery charger in which the charging stop temperature is set at 60 degrees centigrade can stop charging when the battery temperature reaches 60 degrees centigrade. However, in the battery charger having a plurality of attachment channels, all the attachment portions are not always set with the batteries when charging. In fact, in a battery charger having a plurality of channels for charging four batteries arranged in four rows, the battery charger did not stop charging until the battery temperature reached 65 degrees centigrade, even though the charging stop temperature was set at 60 degrees centigrade. In such a case, the two batteries were separately attached to attachment portions at both ends of the battery charger. If the batteries are charged until the battery temperature rises to an abnormally high level, their efficiency will be reduced. To avoid this harmful effect, the charging stop temperature is set at 55 degrees centigrade so as to stop charging if the temperature of the batteries at both ends of the battery charger has reached 60 degrees centigrade. Hence, when all attachment channels are provided with batteries, the battery charger stops charging if the battery temperature reaches 55 degrees centigrade. When the charging stop temperature is set at a low temperature, full charge cannot be attained, and the unwanted effect of stopping of charging normal batteries is caused.

The present invention was developed for the purpose of overcoming the above-described drawbacks. It is thus a primary object of the present invention to provide a battery charger having a plurality of attachment channels, that can definitely stop charging when the battery temperature reaches a set temperature, while using only a few temperature sensors.

SUMMARY OF THE INVENTION

The present invention is a battery charger for charging a plurality of rechargeable batteries attached in a detachable fashion, and is provided with temperature sensors for detecting the temperature of the batteries to be charged. The battery charger compares the battery temperature detected by the temperature sensors with a charging stop temperature, and stops charging if the detected temperature has exceeded the charging stop temperature. Further, the battery charger has a plurality of battery attachment detectors for respectively and independently detecting the presence of the batteries. The number of temperature sensors is made less than the total number of the batteries to be attached. In addition, the temperature sensors vary the charging stop temperature in accordance with the number of batteries detected in position by each of the attachment detectors.

The battery charger having this structure has the feature that it can definitely stop charging the batteries that have reached a set temperature, while using only a few temperature sensors. This is because the battery charger has a plurality of attachment detectors for respectively and independently detecting the presence of the batteries, and varies the charging stop temperature for stopping charging according to the battery attachment position detected by each of the battery attachment detectors. Since the battery charger changes the charging stop temperature to the most suitable temperature for stopping charging in accordance with the battery attachment situation, it can definitely stop charging when the actual battery temperature reaches a set temperature even though the number of temperature sensors is less than the total number of batteries. In this manner, the battery charger is capable of reducing the number of temperature sensors can be mass-produced at low cost due to cost reductions associated with parts and production.

The temperature sensor can be placed between two adjacent batteries. In this battery charger, the cost of production and parts can be reduced by cutting the number of temperature sensors in half. If the temperature detected by the temperature sensors has reached the charging stop temperature, the battery charger can stop charging by cutting off charging current. Further, it can significantly reduce charging by changing charging current to trickle charging current, if the detected temperature has reached the charging stop temperature. The battery charger is also provided with switching devices, connected in series to each battery, in order to control charging current, and can stop charging by moving the switching devices to an Off position, if the detected temperature has reached charging stop temperature.

The attachment detectors can detect battery presence by detecting voltage change of output terminals connected to the batteries. This configuration makes it possible to detect the presence of batteries with a simple circuit structure.

The above and further objects and features of the invention will be more fully apparent from the following detailed description in conjunction with the accompanying drawings.

DETAILED DESCRIPTION OF THE INVENTION

Figure 1:
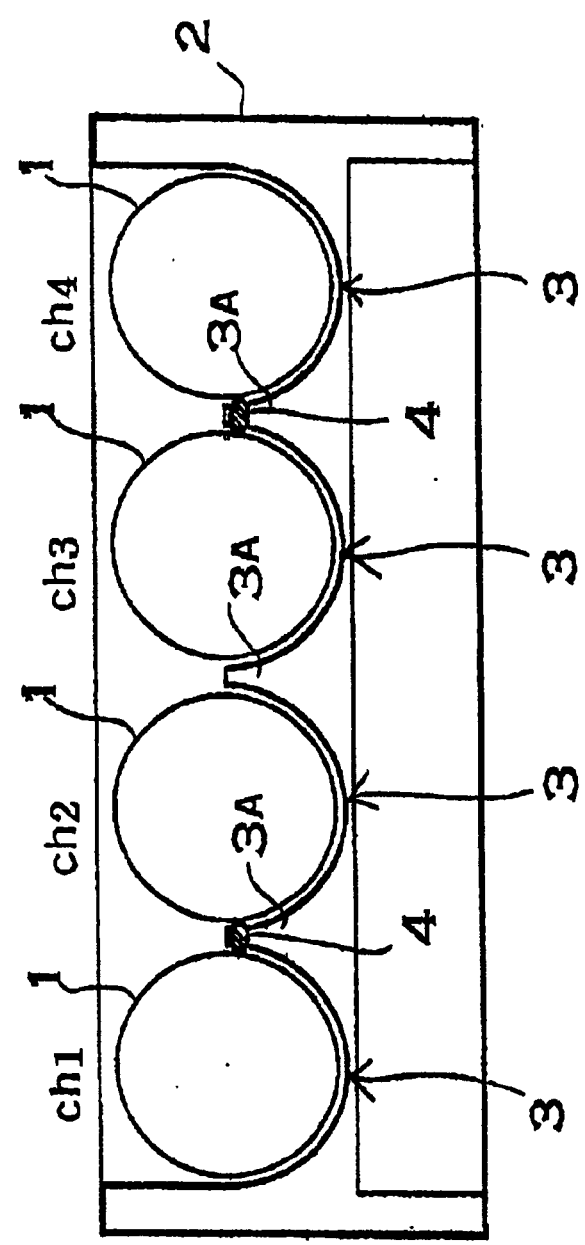
FIG. 1 is a cross-sectional view of an embodiment of a battery charger having a plurality of battery attachment channels.

A battery charger having a plurality of attachment channels, as shown in the cross-sectional view of FIG. 1, is provided with attachment portions so that a plurality of batteries 1 can be attached to a case 2 in a detachable fashion. The battery charger shown in the figure is provided with the attachment portions 3 of attachment channels 1 to 4 so that four batteries 1 can be attached. The battery charger of the present invention can charge two or more batteries 1. Therefore, it is possible to structure a battery charger capable of charging two or three batteries 1, or five or more batteries 1. The attachment portions 3 of the battery charger are provided with output terminals (not illustrated) touching positive and negative electrodes of the batteries to be charged. The batteries 1 in the attachment portions 3 are charged by connecting the output terminals to the batteries 1.

Figure 2:
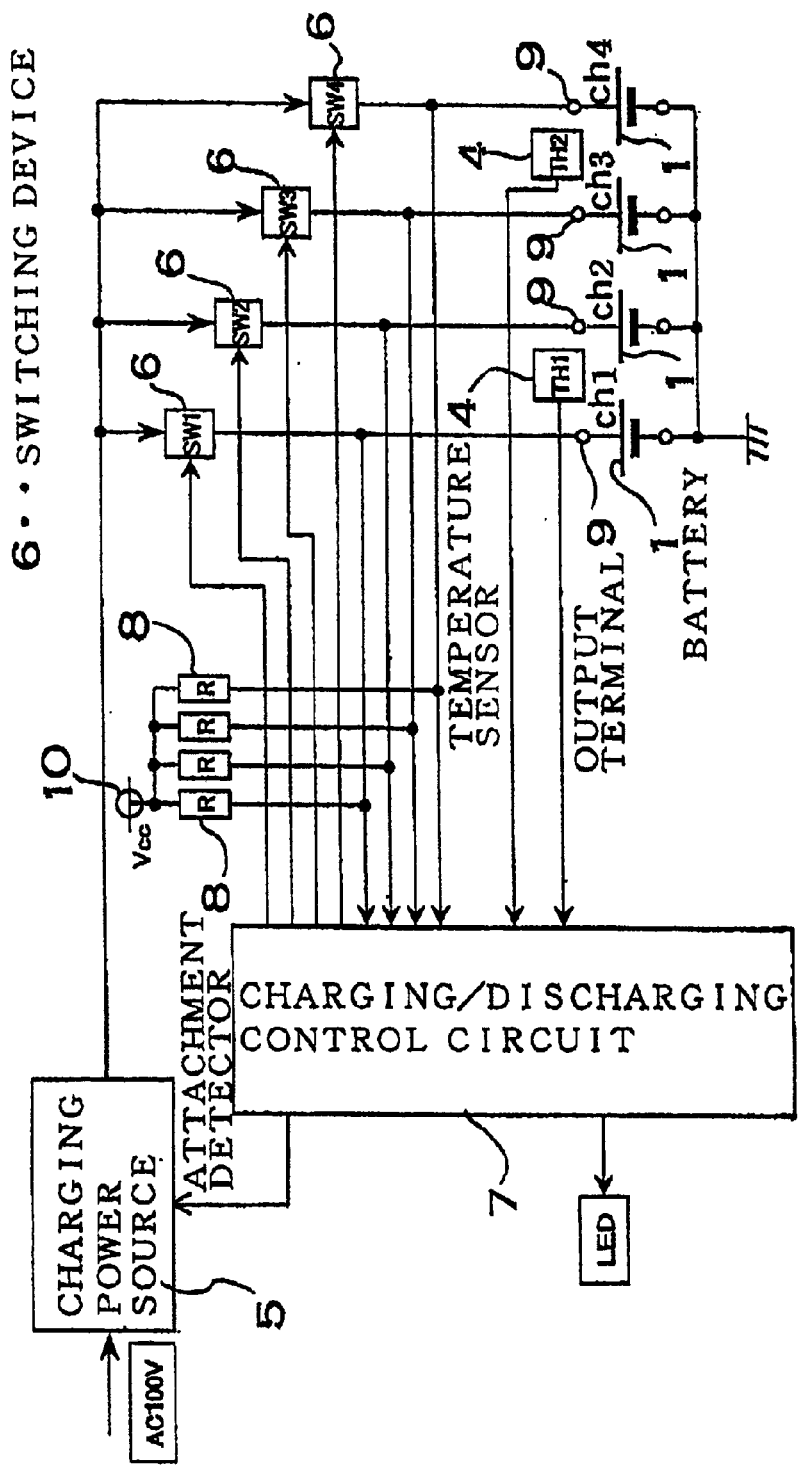
FIG. 2 is a circuit diagram of an embodiment of the battery charger, having a plurality of attachment channels.

FIG. 2 is a circuit diagram of a battery charger having a plurality of attachment channels. This battery charger is comprised of a charging power source 5 for converting an input alternating current into a direct current for charging the batteries 1, switching devices 6 which connect the output side of the charging power source 5 with each battery 1, a charging/discharging control circuit 7 for controlling the switching devices 6, temperature sensors 4 for sending temperature signals of the batteries 1 to the charging/discharging control circuit 7, and attachment detectors 8 for detecting attachment of the batteries 1.

The charging power source 5 converts an input commercial electric power source, an alternating current of 100V in Japan, into charging voltage for the batteries 1. The charging power source 5, not illustrated, is comprised of a transformer for converting voltage, a rectifying circuit for rectifying an alternating current, and a smoothing circuit for smoothing the rectified pulsating current. The charging power source 5 can make a constant current property or a constant voltage property by feeding back the signals from the charging/discharging control circuit 7.

The switching device 6 is a semiconductor switching device made of transistors and FETs. The switching devices 6 are inserted between the charging power source 5 and each battery 1 to control the charging current for each battery 1. The switching devices 6 in an On or Off state are controlled by the charging/discharging control circuit 7. The switching devices 6 in an On state permit charging current to be sent to the connected batteries 1. The switching devices 6 in an Off state cut off charging current to stop charging of the connected batteries 1. When the batteries 1 are fully charged, or the detected temperature reaches the charging stop temperature, the switching devices 6 are switched from an On state to an Off state.

The number of temperature sensors 4 is less than the total number of batteries. In the battery charger shown in the figure, the number of batteries 1 to be charged is four and the number of temperature sensors 4 is two. Therefore, the temperature sensors 4 do not independently detect the temperature of all of the batteries 1. In the battery charger of FIG. 1, a temperature sensor 4 is disposed between two adjacent batteries 1. Namely, one temperature sensor 4 is disposed between channels 1 and 2, and the other temperature sensor 4 is disposed between channels 3 and 4. The battery charger of the figure has a projecting convex part 3A between adjacent batteries 1. The temperature sensor 4 is disposed on the convex part 3A. In a battery charger having this structure, the battery 1 temperature is detected by temperature sensors 4, which number half the total number of the batteries 1. The temperature sensor 4 can be disposed almost in the middle of the batteries that are arranged in three or more parallel rows. For example, a temperature sensor can be disposed in the middle of batteries arranged in three or four rows. However, reducing the number of temperature sensors with respect to the total number of batteries results in a less precise detection of the temperature of batteries that are attached further away from the temperature sensor 4. As shown in FIG. 1, a battery charger in which a temperature sensor 4 is placed between two adjacent batteries 1 can accurately detect the temperature of those batteries through that temperature sensor 4. Accordingly, in a battery charger, with temperature sensors 4 numbering half the total number of batteries, it is preferable that they are placed between adjacent batteries 1.

The temperature sensor 4 is a thermistor. However, besides the thermistor, all devices of which electric resistance varies according to temperature can be used as a temperature sensor 4.

The attachment detectors 8 detect the presence of the batteries 1 by detecting voltage change at the output terminals 9 connected to the batteries 1. The attachment detectors 8 detect the presence of a plurality of batteries 1 respectively and independently. Therefore, a battery charger for charging four batteries 1 has four attachment detectors 8. Each of the attachment detectors 8 has pull-up resistance. In the pull-up resistance, one end is connected to the electric power source circuit 10, and the other is connected to the output terminal 9. The attachment detectors 8 treats voltage at the output terminal 9 as electric power source voltage when batteries 1 are not attached, and as battery voltage when batteries 1 are attached. The electric power source voltage is set greater than the battery voltage. Therefore, the voltage of the output terminal 9 is dropped when the batteries 1 are attached, which can make it possible to detect the presence of the batteries 1.

The above-mentioned attachment detectors 8 electrically detects a battery attachment state by voltage change at the output terminal 9. In the attachment detectors 8, for example, limit switches can be placed in the attachment portions of attachment channels 1 to 4 in such a manner that each limit switch can determine the battery attachment state of each attachment portion.

The charging/discharging control circuit 7 controls the switching devices 6 by means of signals from the temperature sensors 4 and attachment detectors 8. The charging/discharging control circuit 7 compares the detected temperature input from the temperature sensors 4 and charging stop temperature, and switches off the switching devices 6 to stop charging when the detected temperature becomes greater than the charging stop temperature. The charging stop temperature is varied in accordance with the attachment state of the batteries 1. Therefore, the charging/discharging control circuit 7 varies the charging stop temperature for stopping charging in accordance with battery attachment positions detected by each of the attachment detectors 8.

Tables 1 and 2 show charging stop temperature that is varied in accordance with the attachment state of the batteries. Table 1 shows charging stop temperature when the temperature at the beginning of charging is greater than 33 degrees centigrade. Table 2 shows charging stop temperature when the temperature at the beginning of charging is less than or equal to 33 degrees centigrade.

In these tables, TH1 shows the charging stop temperature of the temperature sensor 4 disposed between channels 1 and 2, and TH2 shows the charging stop temperature of the temperature sensor 4 disposed between channels 3 and 4. As shown in these tables, the charging stop temperature is varied in accordance with the detected battery attachment positions as the number of batteries is increased like 1, 2, 3 and 4. The charging stop temperature, as shown in these tables, is higher on average when a multiplicity of batteries is attached, and is lower when the number of batteries is decreased. This is because the temperature detected by the temperature sensors 4 will increase, even though the battery temperature is the same, when a multiplicity of batteries is charged at the same time.

TABLE 1

| The number of batteries | Attachment channel | TH1 | TH2 |
|---|---|---|---|
| 1 | 1 | 55° C. | 52° C. |
|  | 2 | 54° C. | 54° C. |
|  | 3 | 52° C. | 52° C. |
|  | 4 | 51° C. | 54° C. |
| 2 | 1, 2 | 55° C. | 51° C. |
|  | 1, 3 | 54° C. | 54° C. |
|  | 1, 4 | 54° C. | 54° C. |
|  | 2, 3 | 54° C. | 54° C. |
|  | 2, 4 | 54° C. | 54° C. |
|  | 3, 4 | 51° C. | 55° C. |
| 3 | 1, 2, 3 | 60° C. | 60° C. |
|  | 1, 2, 4 | 60° C. | 60° C. |
|  | 1, 3, 4 | 60° C. | 60° C. |
|  | 2, 3, 4 | 60° C. | 60° C. |
| 4 | 1, 2, 3, 4 | 60° C. | 60° C. |

TABLE 2

| The number of batteries | Attachment channel | TH1 | TH2 |
|---|---|---|---|
| 1 | 1 | 54° C. | 51° C. |
|  | 2 | 53° C. | 53° C. |
|  | 3 | 51° C. | 51° C. |
|  | 4 | 50° C. | 53° C. |
| 2 | 1, 2 | 54° C. | 50° C. |
|  | 1, 3 | 53° C. | 53° C. |
|  | 1, 4 | 53° C. | 53° C. |
|  | 2, 3 | 53° C. | 53° C. |
|  | 2, 4 | 53° C. | 53° C. |
|  | 3, 4 | 50° C. | 54° C. |
| 3 | 1, 2, 3 | 59° C. | 59° C. |
|  | 1, 2, 4 | 59° C. | 59° C. |
|  | 1, 3, 4 | 59° C. | 59° C. |
|  | 2, 3, 4 | 59° C. | 59° C. |
| 4 | 1, 2, 3, 4 | 59° C. | 59° C. |

The charging/discharging control circuit 7 compares the temperature detected by the temperature sensors 4 and the charging stop temperature shown in Tables 1 and 2, and switches off the switching devices 6 to stop charging when the detected temperature becomes greater than the charging stop temperature. The charging/discharging control circuit 7 emits a signal that causes all the switching devices 6 to switch off and charging to stop when one of the temperature sensors 4 detects a temperature that is greater than the charging stop temperature. However, when one of the temperature sensors 4 detects a temperature that is greater than the charging stop temperature, the charging/discharging control circuit 7 can also stop charging by switching off only the switching devices 6 of channels disposed near the temperature sensor 4 that has detected a greater temperature than the charging stop temperature, instead of switching off all of the switching devices 6. For example, when the temperature detected by TH1 temperature sensor 4 exceeds the charging stop temperature, and the temperature detected by TH2 temperature sensor 4 does not exceed the charging stop temperature, the switching devices 6 associated with channels 1 and 2 are switched off, and when the temperature detected by TH2 temperature sensor 4 exceeds the charging stop temperature, and the temperature detected by TH1 temperature sensor 4 does not exceed the charging stop temperature, the switching devices 6 associated with channels 3 and 4 are switched off.

The above-mentioned battery charger switches off the switching devices 6 to stop charging when the detected temperature exceeds the charging stop temperature. However, when the detected temperature exceeds the charging stop temperature, the battery charger can also reduce charging by switching charging current to trickle charging current instead of completely stopping charging.

As this invention may be embodied in several forms without departing from the spirit or the essential characteristics thereof, the present embodiment is therefore illustrative and not restrictive, since the scope of the invention is defined by the appended claims rather than by the description preceding them, and all changes that fall within the metes and bounds of the claims, or the equivalence of such metes and bounds thereof are therefore intended to be embraced by the claims.

What is claimed is:

1. A battery charger for charging a plurality of rechargeable batteries, the battery charger comprising:
   (a) a casing defining a plurality of battery attachment channels, wherein each of the battery attachment channels is adapted to removably receive at least one of the rechargeable batteries;
   (b) a plurality of temperature sensors for detection a temperature of the rechargeable batteries during a charging operation, wherein the number of temperature sensors is less than the number of the battery attachment channels;
   (c) a plurality of battery detectors for detecting the presence and position of the rechargeable batteries in the battery attachment channels, respectively; and
   (d) a control circuit for (1) adjusting the charging stop temperature in accordance with signals received from the battery detectors and (2) comparing temperatures detected by the temperature sensors with the charging stop temperature, and stopping a charging operation when the detected temperature becomes greater than the charging stop temperature.

2. A battery charger as claimed in claim 1, wherein the control circuit is operable to stop the charging operation when a signal form one of the temperature detectors indicates that the battery temperature is equal to the charging stop temperature.

3. A battery charger for charging a plurality of rechargeable batteries the battery charger comprising;
   (a) a casing defining a plurality of battery attachment channels wherein each of the battery attachment channels is adapted to removably receive at least one of the rechargeable batteries;
   (b) a plurality of temperature sensors for detecting a temperature of the rechargeable batteries during a charging operation wherein the number of temperature sensors is less than the number of the battery attachment channels (c) a plurality of battery detectors for detecting the presence and position of the rechargeable batteries in the battery attachment channels respectively; and (d) a control circuit for (1) adjusting a charging stop temperature in accordance with signals received from the battery detectors and (2) comparing temperatures detected by the temperature sensors with the charging stop temperature, so that when the detected temperature equals the charging stop temperature, the control circuit operates to reduce the charging current to a trickle charging current.

4. A battery charger as claimed in claim 1, wherein the control circuit comprises:

a plurality of switching devices for connecting an output side of a charging power source to the batteries; and a charging/discharging control circuit for controlling the switching devices.

5. A battery charger as claimed in claim 1, wherein the control circuit is operable to adjust the charging stop temperature in accordance with a temperature detected at the beginning of a charging operation.

6. A battery charger as claimed in claim 1, wherein the control circuit is operable to determine the position of the rechargeable batteries in the battery attachment channels based on signals received from the battery attachment detectors, and the control circuit is operable to adjust the charging stop temperature based on the number and position of the batteries detected by the battery detectors.

7. A battery charger as claimed in claim 4, wherein the control circuit is operable to switch off all of the switching devices in order to stop a charging operation when one of the temperature sensors detects a temperature that is greater than or equal to the charging stop temperature.

8. A battery charger as recited in claim 4, wherein when one of the temperature sensors detects a temperature that is greater than the charging stop temperature, less than all of the switching devices are switched off by the charging/discharging control circuit.

9. A battery charger as claimed in claim 1, wherein each temperature sensor is disposed between two adjacent batteries.

10. A battery charger as claimed in claim 9, wherein the battery attachment channels form a projecting convex part between adjacent ones of the battery attachment channels, and the temperature sensors are disposed on the projecting convex parts, respectively.

11. A battery charger as claimed in claim 1, wherein the battery attachment channels are arranged in three or more parallel rows, and the temperature sensors are disposed between the first and last rows.

12. A battery charger as claimed in claim 1, wherein each of the battery attachment channels is associated with an output terminal on the battery casing, and the battery detectors are operable to detect the presence of the batteries by detecting a voltage change at the output terminals.

13. A battery charger as claimed in claim 1, wherein each of the battery detectors comprises a semiconductor switching device capable of controlling the charging current supplied to each of the battery attachment channels.

* * * * *